US008713294B2

(12) United States Patent
Gooding et al.

(10) Patent No.: US 8,713,294 B2
(45) Date of Patent: Apr. 29, 2014

(54) HEAP/STACK GUARD PAGES USING A WAKEUP UNIT

(75) Inventors: Thomas M. Gooding, Yorktown Heights, NY (US); David L. Satterfield, Yorktown Heights, NY (US); Burkhard Steinmacher-Burow, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 12/696,817

(22) Filed: Jan. 29, 2010

(65) Prior Publication Data

US 2011/0119445 A1 May 19, 2011

Related U.S. Application Data

(60) Provisional application No. 61/261,269, filed on Nov. 13, 2009, provisional application No. 61/293,611, filed on Jan. 8, 2010, provisional application No. 61/295,669, filed on Jan. 15, 2010.

(51) Int. Cl.
*G06F 15/00* (2006.01)
*G06F 7/38* (2006.01)
*G06F 9/00* (2006.01)
*G06F 9/44* (2006.01)

(52) U.S. Cl.
USPC .......................................... 712/244; 712/220

(58) Field of Classification Search
None
See application file for complete search history.

(56) References Cited

U.S. PATENT DOCUMENTS

2006/0242375 A1* 10/2006 Sharpe et al. ................. 711/165
2007/0195103 A1* 8/2007 Koufaty ........................ 345/559

OTHER PUBLICATIONS

Zhou et al. (Efficient and Flexible Architectural Support for Dynamic Monitoring, Mar. 2005, pp. 3-33).*

* cited by examiner

*Primary Examiner* — Andrew Caldwell
*Assistant Examiner* — George Giroux
(74) *Attorney, Agent, or Firm* — Scully, Scott, Murphy & Presser, P.C.; Daniel P. Morris, Esq.

(57) ABSTRACT

A method and system for providing a memory access check on a processor including the steps of detecting accesses to a memory device including level-1 cache using a wakeup unit. The method includes invalidating level-1 cache ranges corresponding to a guard page, and configuring a plurality of wakeup address compare (WAC) registers to allow access to selected WAC registers. The method selects one of the plurality of WAC registers, and sets up a WAC register related to the guard page. The method configures the wakeup unit to interrupt on access of the selected WAC register. The method detects access of the memory device using the wakeup unit when a guard page is violated. The method generates an interrupt to the core using the wakeup unit, and determines the source of the interrupt. The method detects the activated WAC registers assigned to the violated guard page, and initiates a response.

19 Claims, 8 Drawing Sheets

HEAP/STACK GUARD PAGES USING A WAKEUP UNIT

CROSS-REFERENCE TO RELATED APPLICATIONS

This application claims the benefit of U.S. Patent Application Ser. Nos. 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of which is incorporated herein by reference; and is related to the following commonly-owned, co-pending United States Patent Applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502, for "MEMORY SPECULATION IN A MULTI LEVEL CACHE SYSTEM"; U.S. patent application Ser. No. 13/008,583, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 61/293,554, filed Jan. 8, 2010, for "TWO DIFFERENT PREFETCHING COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Ser. No. 12/723,277 for "EMBEDDING GLOBAL BARRIER AND COLLECTIVE IN A TORUS NETWORK"; U.S. patent application Ser. No. 61/293,499, filed Jan. 8, 2010 for "GLOBAL SYNCHRONIZATION OF PARALLEL PROCESSORS USING CLOCK PULSE WIDTH MODULATION"; U.S. patent application Ser. No. 61/293,266, filed Jan. 8, 2010 for "IMPLEMENTATION OF MSYNC"; U.S. patent application Ser. No. 12/796,389 for "NON-STANDARD FLAVORS OF MSYNC"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 12/774,475 for "REPRODUCIBILITY IN A MULTIPROCESSOR SYSTEM".

STATEMENT REGARDING FEDERALLY SPONSORED RESEARCH OF DEVELOPMENT

This invention was made with Government support under Contract No.: B554331 awarded by the Department of Energy. The Government has certain rights in this invention.

BACKGROUND

The present invention generally relates to a method and system for enhancing performance of a computer system, and more particularly, a method and system for enhancing efficiency of processing in a computer system and in a processor with multiple processing threads for use in a massively parallel supercomputer.

Traditional operating systems rely on a MMU (memory management unit) to create mappings for applications. However, it is often desirable to create a hole between application heap and application stacks. The hole catches applications that may be using too much stack space, or buffer overruns. If these conditions silently occur, debugging applications can be extremely difficult. Debugger applications may be used to perform a memory access check. The sizes of the stack and heap are dynamic as the application executes, and therefore, traditional operating systems do not fill the hole when a page-fault occurs in the hole. This causes a segmentation violation and, typically, termination of the program. However, traditional operating systems pay a penalty for this flexibility and must perform page faults as part of their normal execution. For high performance computing operating systems, such as supercomputers, for example, IBM® Blue Gene®, the operating system creates a static memory mapping at application startup. Thus, a disadvantage of current supercomputer systems is that the operating system's creation of a static memory mapping at application startup prevents usage of the traditional technique of using a hole in the MMU as described above.

It would therefore be desirable to provide a system and a method for an operating system to create mappings for applications when the operating system cannot create a hole between application heap and application stacks. Further, it would be desirable to provide a system and method for an operating system to create mappings as above when the operating system creates a static memory mapping at application startup, such as in a supercomputer. It would also be desirable to provide a system and method for an alternative to using a processor or debugger application or facility to perform a memory access check.

BRIEF SUMMARY

In an aspect of the invention, a method for memory access checking on a processor, comprises: providing a computer system including a data storage device having a memory device, the computer system including a program stored in the data storage device and steps of the program being executed by a processor; invalidating memory ranges in the memory device, the invalidating of memory ranges being executed by an operating system; configuring a plurality of wakeup address compare (WAC) registers to allow access to selected WAC registers; selecting one of the plurality of WAC registers using the operating system; setting up a WAC register related to the invalidated memory ranges using the operating system; configuring a wakeup unit to interrupt on access of the selected WAC register using the operating system; detecting access of the memory device using the wakeup unit when an invalidated memory range is violated; generating an interrupt to the core using the wakeup unit; querying the wakeup unit using the operating system when the interrupt is generated to determine the source of the interrupt; detecting the activated WAC registers assigned to the violated invalidated memory range; and initiating a response using the operating system after detecting the activated WAC registers.

In a related aspect, the method includes moving the invalidated memory ranges using the operating system when a top of a heap changes size. The memory device may include cache memory including level-1 cache and the method may further comprise invalidating levels of the cache memory between the wakeup unit and the processor. The invalidated memory ranges in the memory device may correspond to a guard page. The response may include delivering a signal using the operating system after detecting the activated WAC registers. The response may also include terminating an application. The memory device may include cache memory, and the cache memory is positioned above the wakeup unit, such that when the cache memory fetches data from a guard page or stores data into the guard page, the wakeup unit sends an interrupt to a core of the wakeup unit. The guard page may include creating or repositioning or resizing a guard page. The method may further comprise triggering a fault when detecting a data read hit in the guard page. The wakeup unit may be external to the processor. The plurality of WAC registers may be configured as a base address and a bit mask. The plurality of WAC registers may be configured as a base address and a length. The WAC registers may be configured as a base starting address and a base ending address. The method may further comprise sending an interrupt command to a main hardware thread residing on a different core for changing a guard page of the main hardware thread. The method may further comprise: initiating a size change of the heap using a thread; and updating the plurality of WAC registers of the wakeup unit using the thread. The wakeup unit may detect memory accesses between a cache-level above the wakeup unit and a cache-level below the wakeup unit. The method may further comprise detecting access of the memory device between two adjacent levels of cache using the wakeup unit when a guard page is violated.

In another aspect of the invention, a computer program product comprises a computer readable medium having recorded thereon a computer program. A computer system includes a memory device and the computer system includes a processor for executing the steps of the computer program for memory access checking on a computer, the program steps comprise: invalidating memory ranges in the memory device, the invalidating of memory ranges being executed by an operating system; configuring a plurality of wakeup address compare (WAC) registers to allow access to selected WAC registers; selecting one of the plurality of WAC registers using the operating system; setting up a WAC register related to the invalidated memory ranges using the operating system; configuring a wakeup unit to interrupt on access of the selected WAC register using the operating system; detecting access of the memory device using the wakeup unit when an invalidated memory range is violated; generating an interrupt to the core using the wakeup unit; querying the wakeup unit using the operating system when the interrupt is generated to determine the source of the interrupt; detecting the activated WAC registers assigned to the violated invalidated memory range; and initiating a response using the operating system after detecting the activated WAC registers.

In a related aspect, the computer program product further comprises moving the invalidated memory ranges using the operating system when a top of a heap changes size. The memory device includes cache memory including level-1 cache and the method further comprising invalidating levels of the cache memory between the wakeup unit and the processor. The invalidated memory ranges in the memory device may correspond to a guard page.

In another aspect of the invention, a system for providing memory access checking on a processor, comprises: a computer system including a data storage device, the computer system including a program stored in the data storage device and steps of the program being executed by a processor; a memory device including level-1 cache; an operating system for invalidating level-1 cache ranges corresponding to a guard page; a plurality of wakeup address compare (WAC) registers being configured to allow access to selected WAC registers, one of the plurality of WAC registers being selected using the operating system; a WAC register being related to the guard page; a wakeup unit interrupting on access of the selected WAC register using the operating system; an interrupt being generated to the core using the wakeup unit; the source of the interrupt being determined by querying the wakeup unit using the operating system when the interrupt is generated; and a response initiated by the operating system after detecting activated WAC registers when access of the memory device is detected using the wakeup unit when the guard age is violated.

In a related aspect, the guard page is moved using the operating system when a top of a heap changes size.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
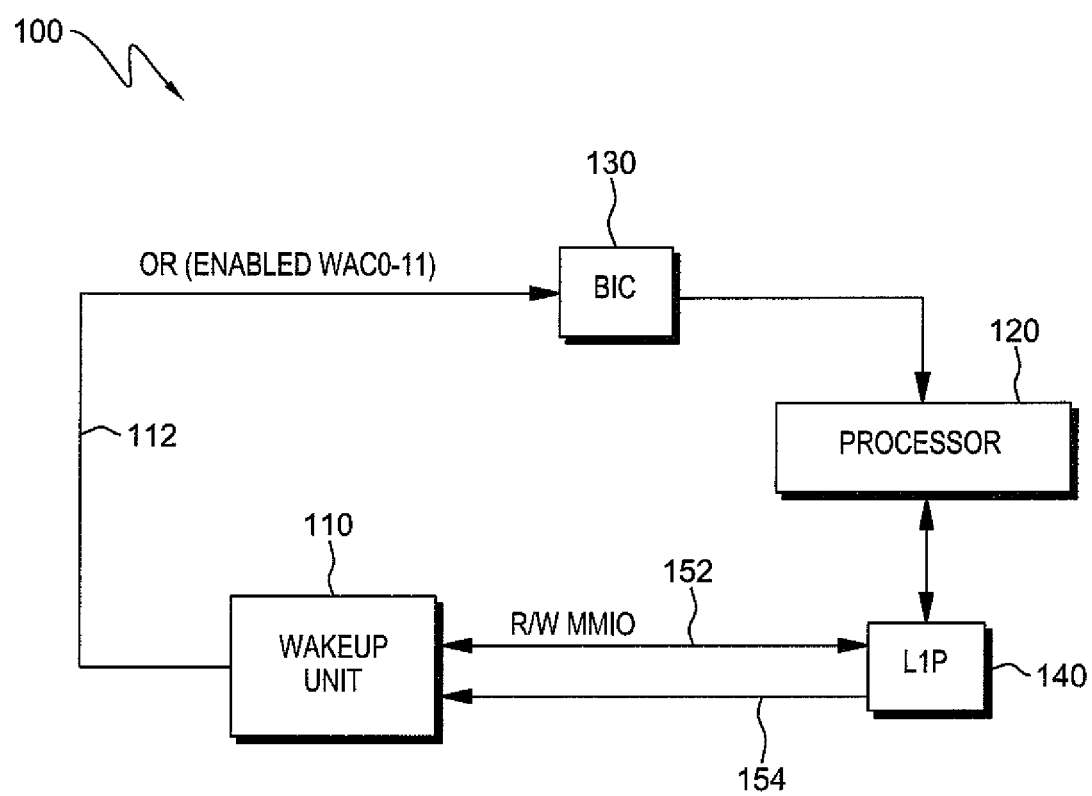
FIG. 1 is a schematic block diagram of a system for enhancing performance of computer resources according to an embodiment of the invention.

Referring to FIG. 1, a system 100 according to the present invention, depicts an external wakeup unit 110 relationship to a processor 120, and to a memory device embodied as level-1 cache (L1p unit) 140. The term processor is used interchangeably herein with core. Alternatively, multiple cores may be used wherein each of the cores 120 has a wakeup unit 110. The wakeup 110 is configured and accessed using memory mapped I/O (MMIO) only from its own core. The system 100 further includes a bus interface card (BIC) 130, and a crossbar switch 150.

In one embodiment of the invention, the wakeup unit 110 drives a hardware connection 112 to the bus interface card (BIC) 130 designated by the code OR (enabled WAC0-11). A processor 120 thread 440 (FIG. 4) wakes or activates on a rising edge. Thus, throughout the wakeup unit 110, a rising edge or value 1 indicates wake-up. The wakeup unit 110 sends an interrupt signal along connection 112 to the BIC 130, which is forwarded to the processor 120. Alternatively, the wakeup unit 110 may send an interrupt signal directly to the processor 120.

Referring to FIG. 1, an input/output (I/O) line 152 is a read/write memory I/O line (r/w MMIO) that allows the processor to go through L1P 140 to program and/or configure the wakeup unit 110. An input line 154 into the wake up unit 110 allows L1P 140 memory accesses to be forwarded to the wake up unit 110. The wake up unit 110 is analyzing wakeup address compare (WAC) registers 452 (shown in FIG. 4) to determine if accesses (loads and stores) happen in one of the ranges that are being watched with the WAC registers, and if one of the ranges is effected. If one of the ranges is effected the wake up unit 110 will enable a bit resulting in an interrupt of the processor 120. Thus, the wake up unit 110 detects memory bus activity as a way of detecting guard page violations.

Figure 2:
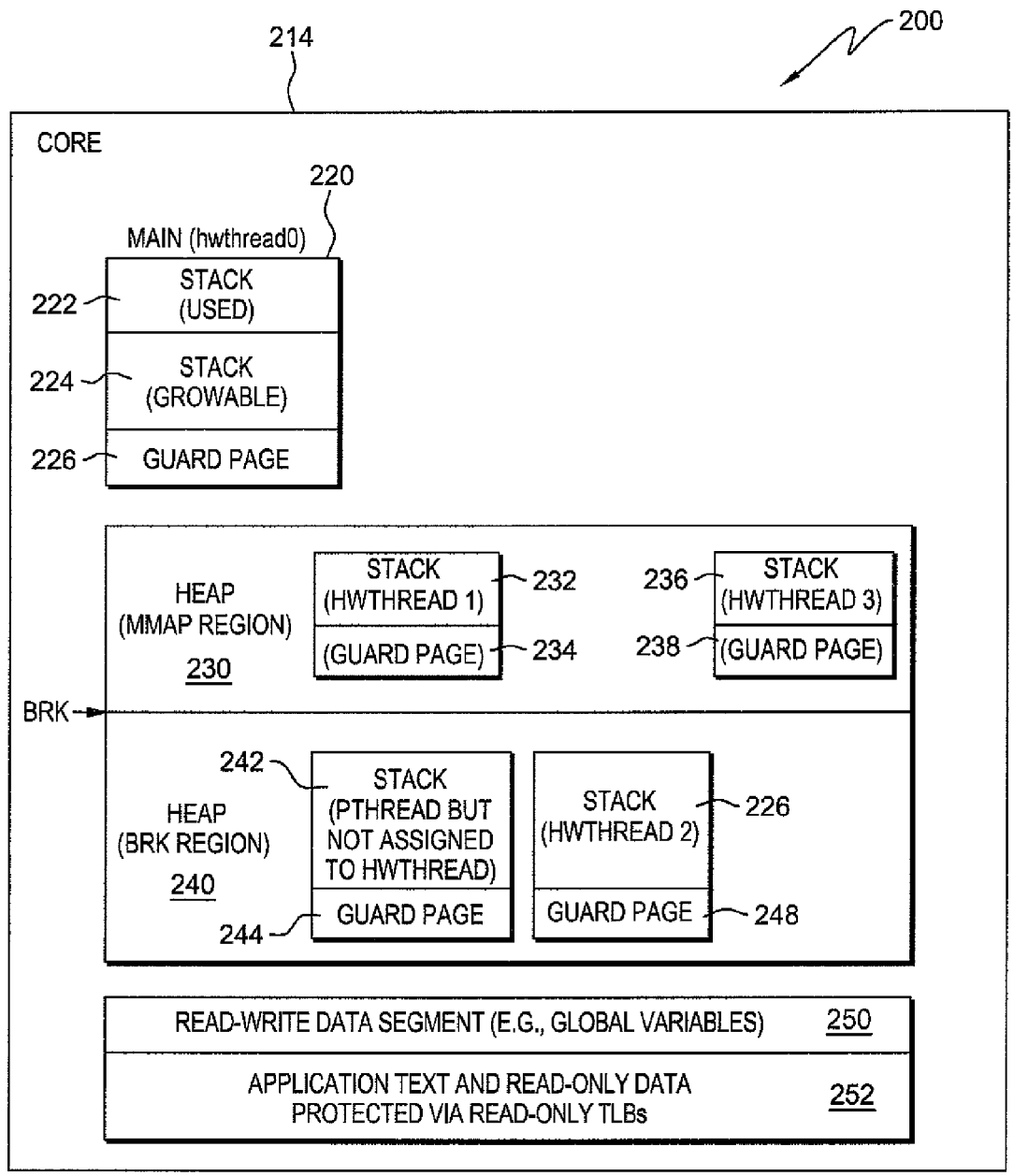
FIG. 2 is a schematic block diagram of a guard page of a stack according to an embodiments of the invention.

Referring to FIG. 2, a system 200 includes a single process on a core 214 with five threads. One thread is not scheduled onto a physical hardware thread (hwthread), and thus its guard page is not active. Guard pages are regions of memory that the operating system positions at the end of the application's stack (i.e., a location of computer memory), in order to prevent a stack overrun. An implicit range of memory covers the main thread, and explicit ranges of memory for each created thread. Contrary to known mechanisms, the system of the present invention only protects the main thread and the active application threads (i.e., if there is a thread that is not scheduled, it is not protected). When a different thread is activated on a core, the system deactivates the protection on the previously active thread and configures the core's memory watch support for the active thread.

The core 214 of the system 200 includes a main hardware (hw) thread 220 having a used stack 222, a growable stack 224, and a guard page 226. A first heap region 230 includes a first stack hwthread 232 and guard page 234, and a third stack hwthread 236 and a guard page 238. A second heap region 240 includes a stack pthread 242 and a guard page 244, and a second stack hwthread 246 and a guard page 248. The core 214 further includes a read-write data segment 250, and an application text and read-only data segment 252.

Using the wakeup unit's 110 registers 452 (FIG. 4), one range is needed per hardware thread. This technique can be used in conjunction with the existing processor-based memory watch registers in order to attain the necessary protection. The wakeup unit 110 ranges can be specified via a number of methods, including starting address and address mask, starting address and length, or starting and stopping addresses.

The guard pages have attributes which typically include the following features:
- A fault occurs when the stack overruns into the heap by the offending thread, (e.g., infinite recursion);
- A fault occurs when any thread accesses a structure in the heap and indexes too far into the stack (e.g., array overrun);
- Data detection, not prevention of data corruption;
- Catching read violations and write violations;
- Debug exceptions occur at critical priority;
- Data address of the violation may be detected, but is not required;
- Guard pages are typically aligned—usually to a 4 kB boundary or better. The size of the guard page is typically a multiple of a 4 kB page size;
- Only the kernel sets/moves guard pages;
- Applications can set the guard page size;
- Each thread has a separate guard region; and
- The kernel can coredump the correct process, to indicate which guard page was violated.

Thereby, instead of using the processor or debugger facilities to perform the memory access check, the system 100 of the present invention uses the wakeup unit 110. The wakeup unit 110 detects memory accesses between the level-1 cache (L1p) and the level-2 cache (L2). If the L1p is fetching or storing data into the guard page region, the wakeup unit will send an interrupt to the wakeup unit's core.

Figure 3:
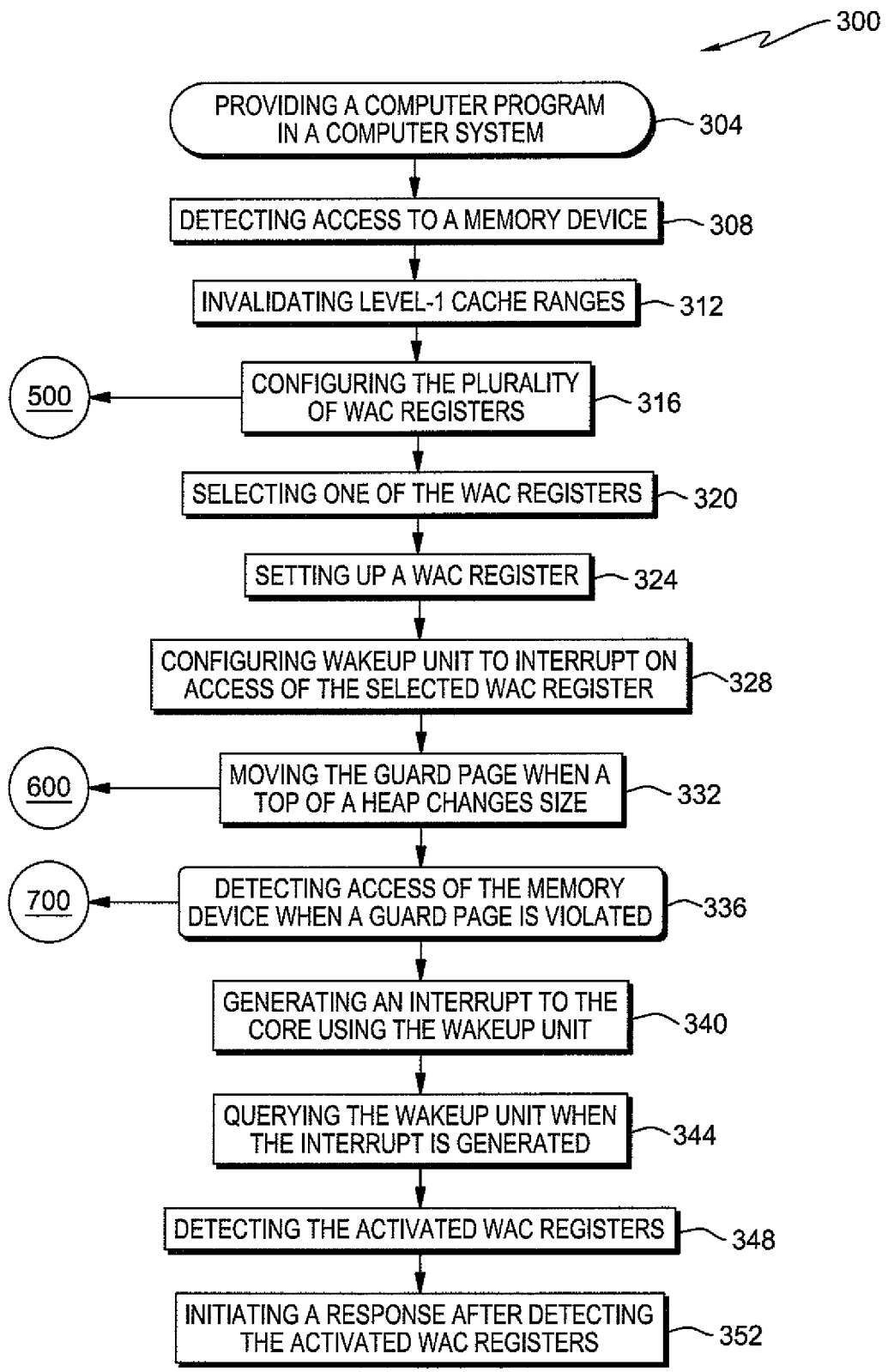
FIG. 3 is a flow chart illustrating a method according to the embodiment of the invention shown in FIGS. 1 and 2.
Figure 4:
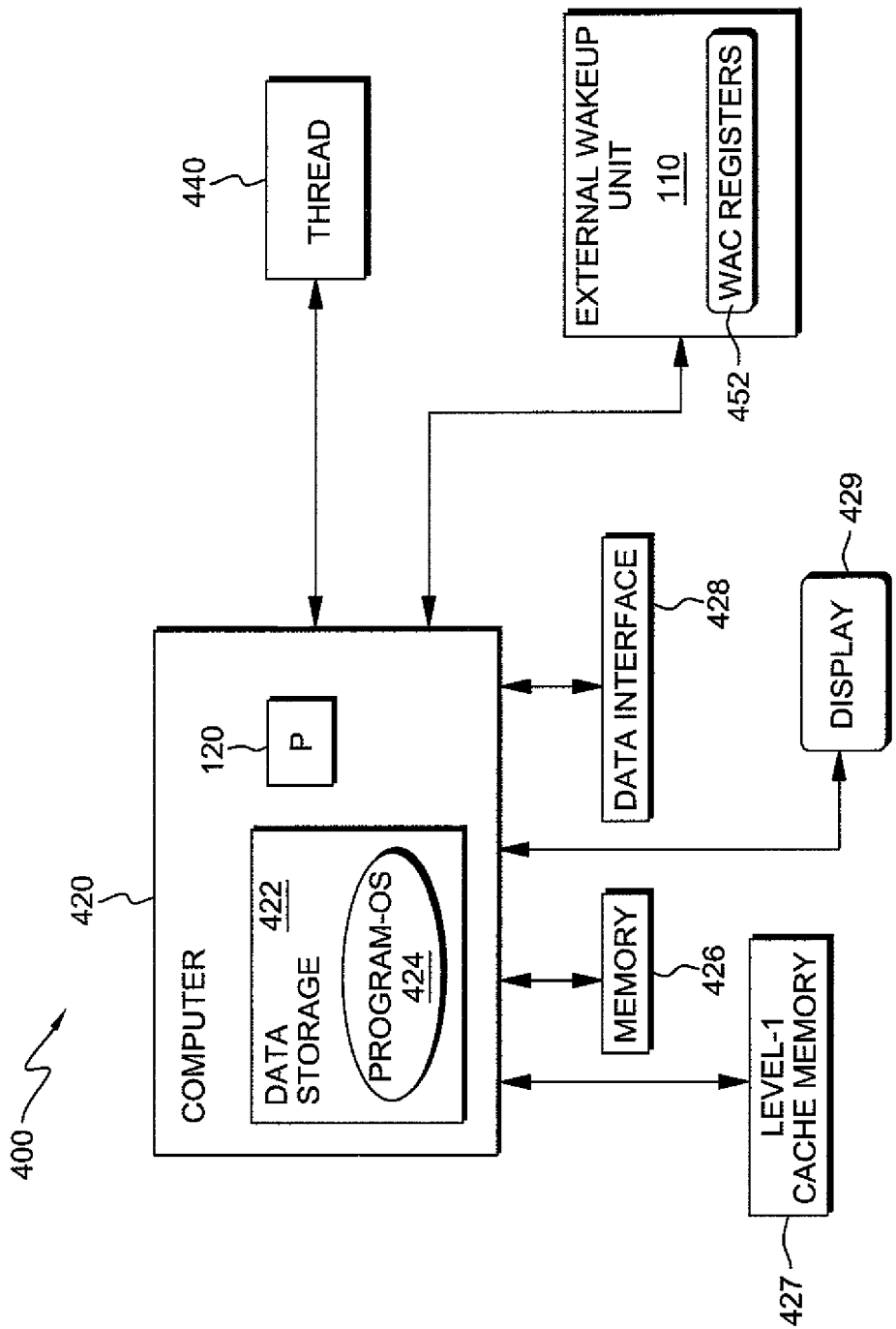
FIG. 4 is a schematic block diagram of a computer system including components shown in FIG. 1.

Referring to FIG. 3, a method 300 according to an embodiment of the invention includes, step 304 providing a computer system 420 (shown in FIG. 4). Using the wakeup unit 110, the method 300 detects access to a memory device in step 308. The memory device may include level-1 cache (L-1), or include level-1 cache to level-2 cache (L-2) data transfers. The method invalidates memory ranges in the memory device using the operating system. In one embodiment of the invention, the memory ranges include L-1 cache memory ranges in the memory device corresponding to a guard page.

The following steps are used to create/reposition/resize a guard page for an embodiment of the invention:
1) Operating system 424 invalidates L1 cache ranges corresponding to the guard page. This ensures that an L1 data read hit in the guard page will trigger a fault. In another embodiment of the invention, the above step may be eliminated;
2) Operating system 424 selects one of the wakeup address compare (WAC) registers 452;
3) Operating system 424 sets up a WAC register 452 to the guard page; and
4) Operating system 424 configures the wakeup unit 110 to interrupt on access.

Referring to FIG. 3, in step 312 of the method 300, the operating system invalidates level-1 cache ranges corresponding to a guard page using the operating system. The method 300 configures the plurality of WAC registers to allow access to selected WAC registers in step 316. In step 320, one of the plurality of WAC registers is selected using the operating system. The method 300 sets up a WAC register related to the guard page using the operating system in step 324. The wakeup unit is configured to interrupt on access of the selected WAC register using the operating system 424 (FIG. 4) in step 328. In step 332, the guard page is moved using the operating system 424 when a top of a heap changes size. Step 336 detects access of the memory device using the wakeup unit when a guard page is violated. Step 340 generates an interrupt to the core using the wakeup unit 110. Step 344 queries the wakeup unit using the operating system 424 when the interrupt is generated to determine the source of the interrupt. Step 348 detects the activated WAC registers assigned to the violated guard page. Step 352 initiates a response using the operating system after detecting the activated WAC registers.

According to the present invention, the WAC registers may be implemented as a base address and a bit mask. An alternative implementation could be a base address and length, or base starting address and base ending address. In step 332, the operating system moves the guard page whenever the top of the heap changes size. Thus, in one embodiment of the invention, when a guard page is violated, the wakeup unit detects the memory access from L1p→L2 and generates an interrupt to the core 120. The operating system 424 takes control when the interrupt occurs and queries the wakeup unit 110 to determine the source of the interrupt. Upon detecting the WAC registers 452 assigned to the guard page that have been activated or tripped, the operating system 424 then initiate a response, for example, delivering a signal, or terminating the application.

When a hardware thread changes the guard page of the main thread, it sends an interprocessor interrupt (IPI) to the main hwthread only if the main hwthread resides on a different processor 120. Otherwise, the thread that caused the heap to change size can directly update the wakeup unit WAC registers. Alternatively, the operating system could ignore this optimization and always interrupt.

Unlike other supercomputer solutions, the data address compare (DAC) registers of the processor of the present invention are still available for debuggers to use and set. This enables the wakeup solution to be used in combination with the debugger.

Referring to FIG. 4, a system 400 according to one embodiment of the invention for enhancing performance of a computer includes a computer 420. The computer 420 includes a data storage device 422 and a software program 424, for example, an operating system. The software program or operating system 424 is stored in the data storage device 422, which may include, for example, a hard drive, or flash memory. The processor 120 executes the program instructions from the program 424. The computer 420 is also connected to a data interface 428 for entering data and a display 429 for displaying information to a user. The external wakeup unit 110 includes a plurality of WAC registers 452. The external unit 110 is configured to detect a specified condition, or in an alternative embodiment, a plurality of specified conditions. The external unit 110 may be configured by the program 424. The external unit 110 waits to detect the specified condition. When the specified condition is detected by the external unit 110, a response is initiated.

In an alternative embodiment of the invention the memory device includes cache memory. The cache memory is positioned adjacent to and nearest the wakeup unit and between the processor and the wakeup unit. When the cache memory fetches data from a guard page or stores data into the guard page, the wakeup unit sends an interrupt to a core of the wakeup unit. Thus, the wakeup unit can be connected between selected levels of cache.

Figure 5:
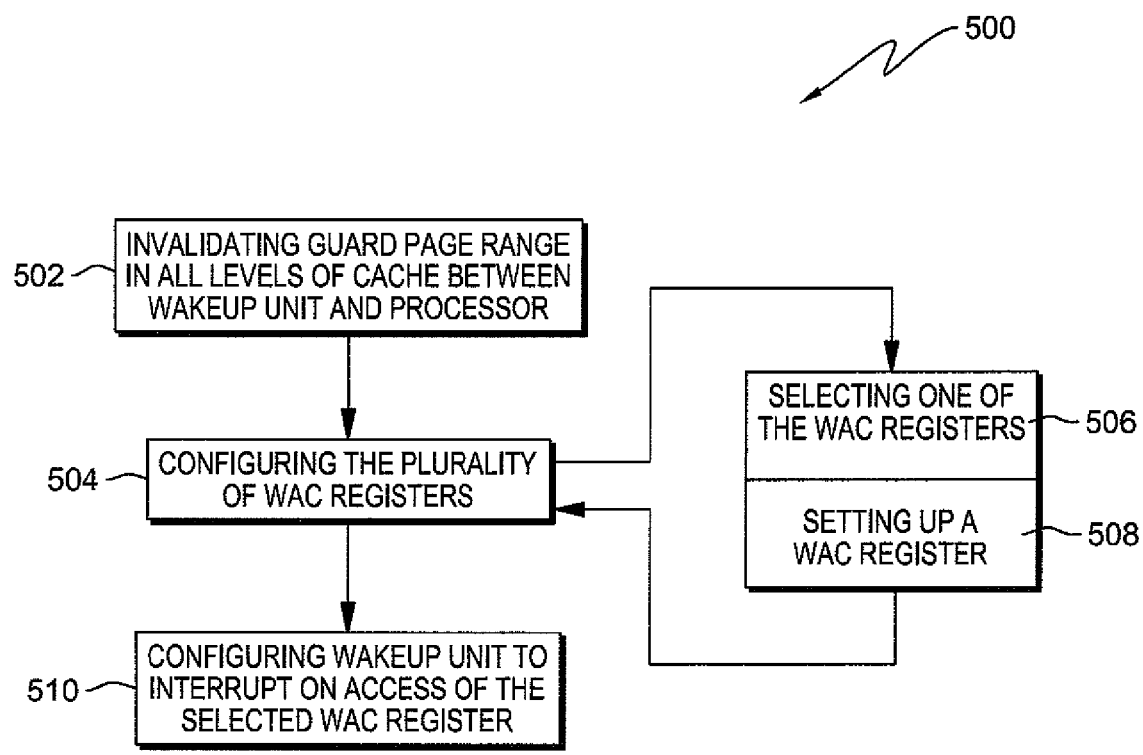
FIG. 5 is a flowchart according to an embodiment of the invention directed to configuring a plurality of WAC registers.

Referring to FIG. 5, in an embodiment of the invention, step 316 shown in FIG. 3 continues to step 502 of sub-method 500 for invalidating a guard page range in all levels of cache between the wakeup unit and the processor. In step 504 the method 300 configures the plurality of WAC registers by selecting one of the WAC registers in step 506 and setting up a WAC register in step 508. The loop between steps, 504, 506 and 508 is reiterated for "n" number of WAC registers. Step 510 includes configuring the wakeup unit to interrupt on access of the selected WAC register.

Figure 6:
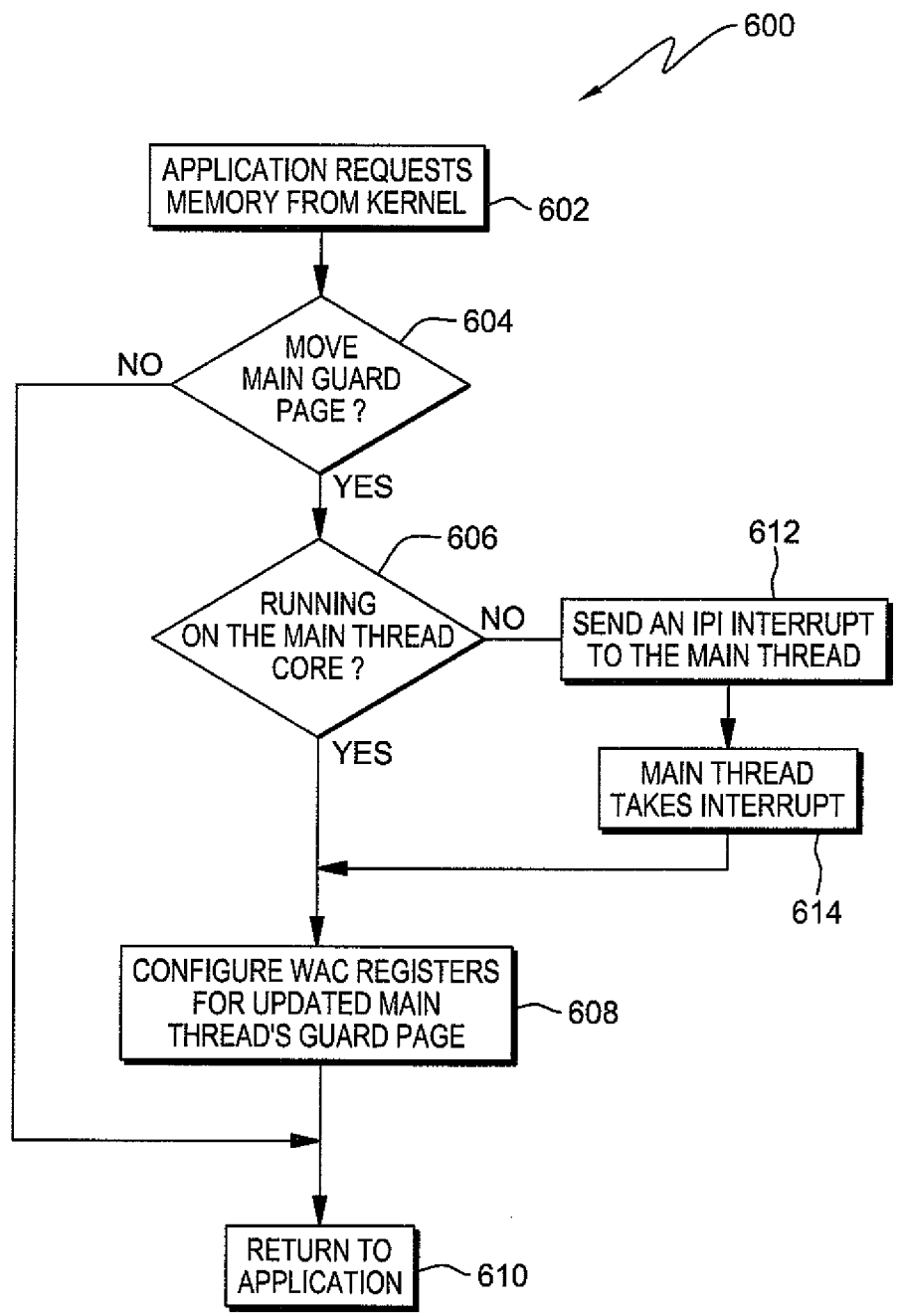
FIG. 6 is a flowchart according to an embodiment of the invention directed to moving a guard page.

Referring to FIG. 6, in an embodiment of the invention, step 332 of the method 300 shown in FIG. 3 continues to step 602 of sub-method 600 wherein an application requests memory from a kernel. In step 604 the method 300 ascertains if the main guard page is moved, if yes, the method proceeds to step 606, if not, the method proceeds to step 610 where the subprogram returns to the application. Step 606 ascertains whether the application is running on the main thread core, if yes, the sub-method 600 continues to step 608 to configure WAC registers for the updated main thread's guard page. If the answer to step 606 is no, the sub-method proceeds to step 612 to send an interprocessor interrupt (IPI) to the main thread. Step 614 include the main thread accepting the interrupt, and the sub-method 600 continues to step 608.

Figure 7:
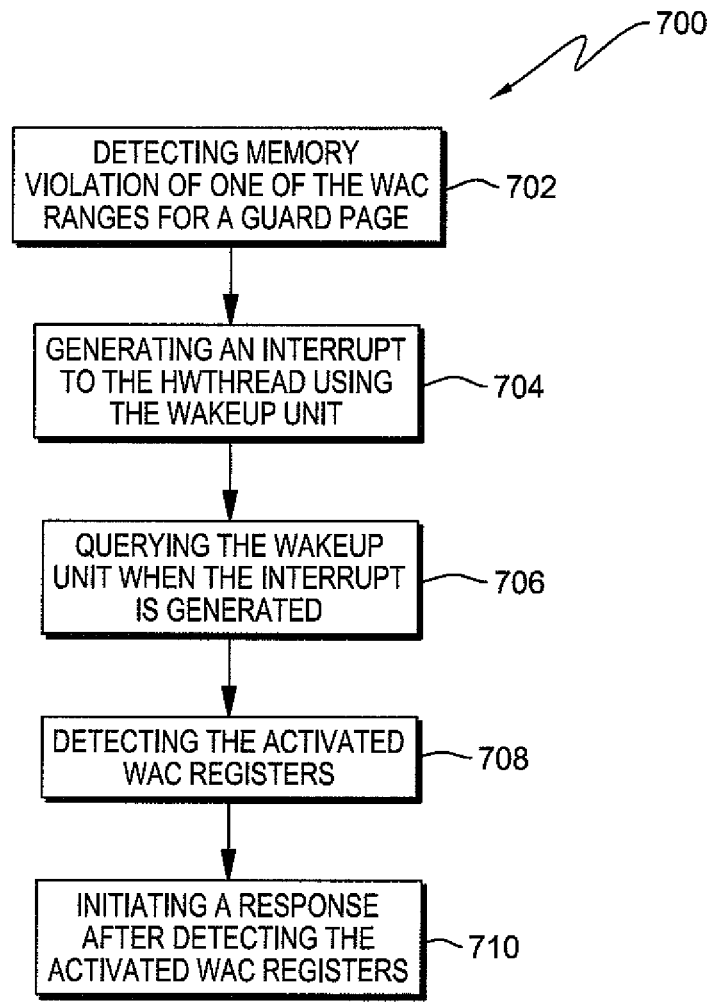
FIG. 7 is a flowchart according to an embodiment of the invention directed to detecting access of the memory device.

Referring to FIG. 7, in an embodiment of the invention, step 336 of the method 300 shown in FIG. 3 continues to step 702 of sub-method 700 for detecting memory violation of one of the WAC ranges for a guard page. Step 704 includes generating an interrupt to the hwthread using the wakeup unit. Step 706 includes querying the wakeup unit when the interrupt is generated. Step 708 includes detecting the activated WAC registers. Step 710 includes initiating a response after detecting the activated WAC registers.

Figure 8:
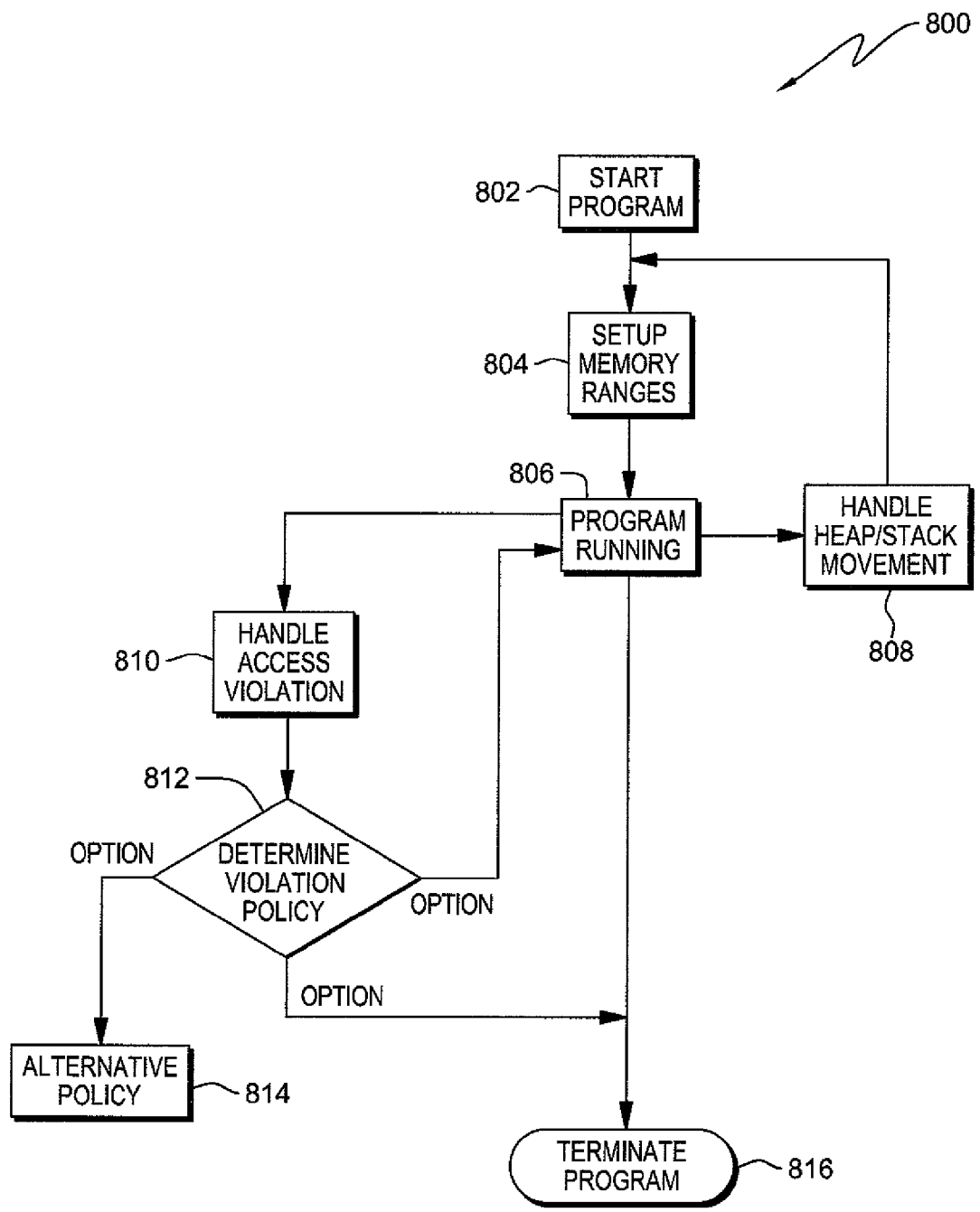
FIG. 8 is a schematic block diagram of a method according to an embodiment of the invention.

Referring to FIG. 8, a high level method 800 encompassing the embodiments of the invention described above includes step 802 starting a program. Step 804 includes setting up memory ranges of interest. While the program is running in step 806, the program handles heap/stack movement in step 808 by adjusting memory ranges in step 804. Also, while the program is running in step 806, the program handles access violations in step 810. The access violations are handled by determining violation policy in step 812. When the policy violation is determined in step 812, the program can continue running in step 806, or terminate in step 816, or proceed to another step 814 having an alternative policy for access violation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIG. 1-8 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for memory access checking on a processor in a computer system including a data storage device having a memory device, the memory device including a first level cache memory (level-1 cache), the computer system including a program stored in the data storage device and steps of the program being executed by a processor, said method comprising:
   invalidating memory ranges within a first level cache memory in the memory device, the invalidated first level cache memory ranges in the memory device corresponding to a guard page, and said guard page being moved subject to a top of heap size change, the invalidating of memory ranges being executed by an operating system;
   configuring a plurality of wakeup address compare (WAC) registers to allow access to selected WAC registers;
   selecting one of the plurality of WAC registers using the operating system;
   setting up the selected WAC register related to the invalidated memory ranges corresponding to said guard page using the operating system;
   configuring a wakeup unit to interrupt on access of the selected WAC register using the operating system;
   detecting access of the memory device between said level-1 cache and a second level cache memory using the wakeup unit when a guard page is violated;
   generating an interrupt to the core using the wakeup unit;
   querying the wakeup unit using the operating system when the interrupt is generated to determine the source of the interrupt;
   detecting the activated WAC registers assigned to the violated guard page; and
   initiating a response using the operating system after detecting the activated WAC registers.

2. The method of claim 1, further comprising:
   moving the invalidated memory ranges using the operating system when a top of a heap changes size.

3. The method of claim 1, further comprising: invalidating levels of the cache memory between the wakeup unit and the processor.

4. The method of claim 1, wherein the response includes delivering a signal using the operating system after detecting the activated WAC registers.

5. The method of claim 1, wherein the response includes terminating an application.

6. The method of claim 2, wherein the memory device includes cache memory, the cache memory being positioned adjacent the wakeup unit and between the processor and the wakeup unit, when the cache memory fetches data from a guard page or stores data into the guard page, the wakeup unit sends an interrupt to a core of the wakeup unit.

7. The method of claim 1, further comprising: modifying the guard page by creating, repositioning or resizing the guard page.

8. The method of claim 1, further comprising: triggering a fault when detecting a data read hit in the guard page.

9. The method of claim 1, wherein the wakeup unit is external to the processor.

10. The method of claim 1 wherein the plurality of WAC registers are configured as a base address and a bit mask.

11. The method of claim 1, wherein the plurality of WAC registers are configured as a base address and a length.

12. The method of claim 1, wherein the WAC registers are configured as a base starting address and a base ending address.

13. The method of claim 1, further comprising:
   sending an interrupt command to a main hardware thread residing on a different core for changing a guard page of the main hardware thread.

14. The method of claim 2, further comprising:
   initiating a size change of the heap using a thread; and
   updating the plurality of WAC registers of the wakeup unit using the thread.

15. The method of claim 3, wherein the wakeup unit detects memory accesses between a cache-level above the wakeup unit and a cache-level below the wakeup unit.

16. A computer program product for memory access checking on a computer system, said computer program product comprising a computer readable medium, the computer readable medium not only a propagating signal, said computer readable medium having recorded therein computer readable instructions for:
   invalidating memory ranges within a first level cache memory in the memory device, the invalidated first level cache memory ranges in the memory device corresponding to a guard page, and said guard page being moved subject to a top of heap size change, the invalidating of memory ranges being executed by an operating system;
   configuring a plurality of wakeup address compare (WAC) registers to allow access to selected WAC registers;
   selecting one of the plurality of WAC registers using the operating system;
   setting up the selected WAC register related to the invalidated memory ranges corresponding to said guard page using the operating system;
   configuring a wakeup unit to interrupt on access of the selected WAC register using the operating system;
   detecting access of the memory device between said level-1 cache and a second level cache memory using the wakeup unit when a guard page is violated;
   generating an interrupt to the core using the wakeup unit;
   querying the wakeup unit using the operating system when the interrupt is generated to determine the source of the interrupt;

detecting the activated WAC registers assigned to the violated guard page; and initiating a response using the operating system after detecting the activated WAC registers.

17. The computer program product of claim 16, further comprising:

moving the invalidated memory ranges using the operating system when a top of a heap changes size.

18. The computer program product of claim 16, further comprising invalidating levels of the cache memory between the wakeup unit and the processor.

19. A system for providing memory access checking on a processor, comprising:

a computer system including a data storage device, the computer system including a program stored in the data storage device and steps of the program being executed by a processor;

a memory device including level-1 cache;

an operating system for invalidating level-1 cache ranges corresponding to a guard page, and said guard page being moved subject to a top of heap size change;

a plurality of wakeup address compare (WAC) registers being configured to allow access to selected WAC registers, one of the plurality of WAC registers being selected using the operating system;

a WAC register being related to invalidated memory ranges corresponding to the guard page;

a wakeup unit interrupting on access of the selected WAC register using the operating system, the wakeup unit detecting access of the memory device between said level-1 cache and a second level cache memory when a guard page is violated;

an interrupt being generated to the core using the wakeup unit; the source of the interrupt being determined by querying the wakeup unit using the operating system when the interrupt is generated; and a response initiated by the operating system after detecting activated WAC registers when access of the memory device is detected using the wakeup unit when the guard age page is violated.

* * * * *